United States Patent [19]
Tran et al.

[11] Patent Number: 5,687,110
[45] Date of Patent: Nov. 11, 1997

[54] ARRAY HAVING AN UPDATE CIRCUIT FOR UPDATING A STORAGE LOCATION WITH A VALUE STORED IN ANOTHER STORAGE LOCATION

[75] Inventors: Thang M. Tran; Andrew McBride, both of Austin, Tex.

[73] Assignee: Advanced Micro Devices, Inc., Sunnyvale, Calif.

[21] Appl. No.: 603,802

[22] Filed: Feb. 20, 1996

[51] Int. Cl.⁶ .................................................. G11C 7/00
[52] U.S. Cl. .................... 365/154; 365/156; 365/189.12
[58] Field of Search ..................... 365/154, 156, 365/189.12, 190; 395/800, 375; 364/231.8, 258

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 5,060,192 | 10/1991 | Young et al. ............................ 365/156 |
| 5,226,126 | 7/1993 | McFarland et al. . |
| 5,226,130 | 7/1993 | Favor et al. . |
| 5,299,156 | 3/1994 | Jiang et al. ............................ 365/156 |
| 5,554,874 | 9/1996 | Deluca .................................... 365/154 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pages 2-1 through 2-4.

Michael Slater, "AMD's K5 Designed to Outrun Pentium," Microprocessor Report, vol. 8, No. 14, Oct. 24, 1994, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—David C. Nelms
*Assistant Examiner*—Vu A. Le
*Attorney, Agent, or Firm*—Conley, Rose & Tayon, P.C.; B. Noel Kivlin

[57] ABSTRACT

A memory including first storage circuits for storing first values and second storages circuit for storing second values is provided. The first value may be retired branch prediction information, while the second value may be speculative branch prediction information. The speculative branch prediction information is updated when the corresponding instructions are fetched, and the retired branch prediction value is updated when the corresponding branch instruction is retired. The speculative branch prediction information is used to form branch predictions. Therefore, the speculatively fetched and executed branches influence subsequent branch predictions. Upon detection of a mispredicted branch or an instruction which causes an exception, the speculative branch prediction information is updated to the corresponding retired branch prediction information. An update circuit is coupled between the first and second storage circuits for transmitting the updated information upon assertion of a control signal. The control signal may be asserted to cause the update of each speculative branch prediction by the corresponding retired branch prediction. The updates occur substantially simultaneously, restoring any corruption to speculative branch predictions due to speculatively fetched branch instructions which were flushed from the instruction processing pipeline. Although discussed herein in terms of a branch prediction array, the memory may be adapted to many other applications.

24 Claims, 8 Drawing Sheets

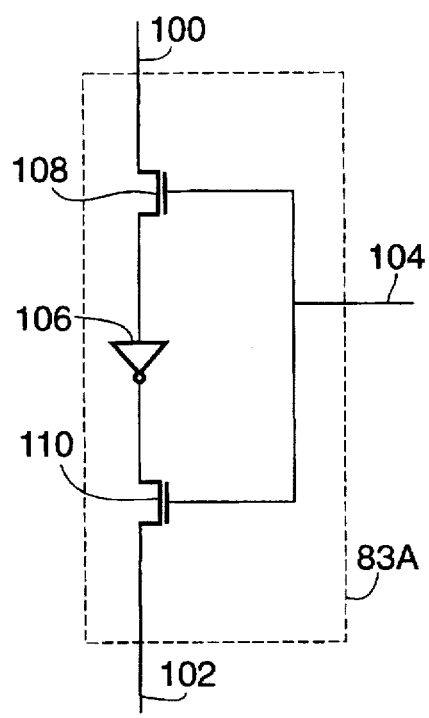
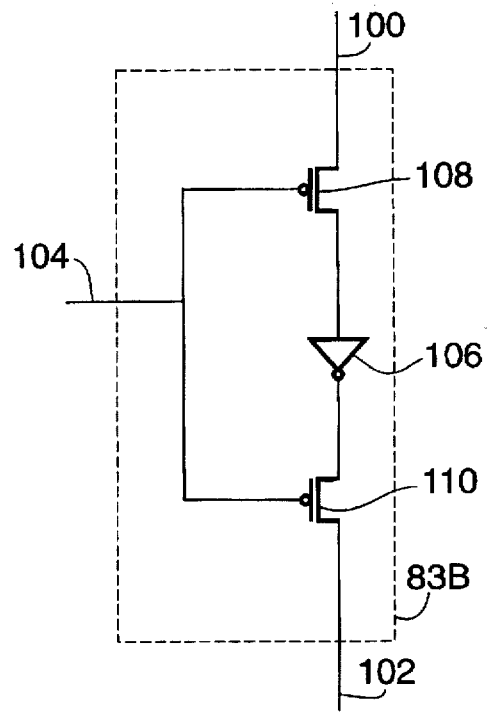
FIG. 7     FIG. 8
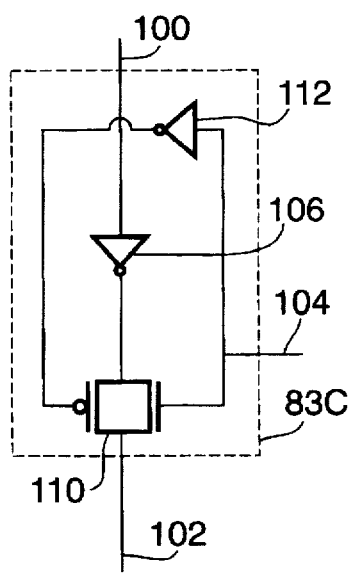
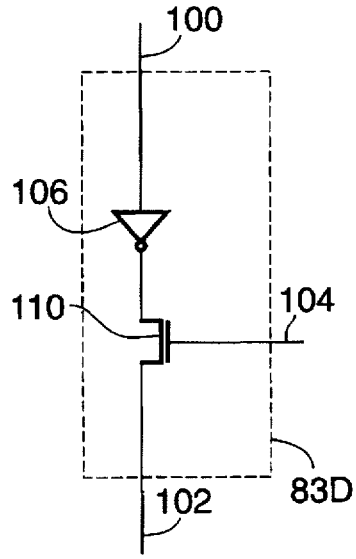
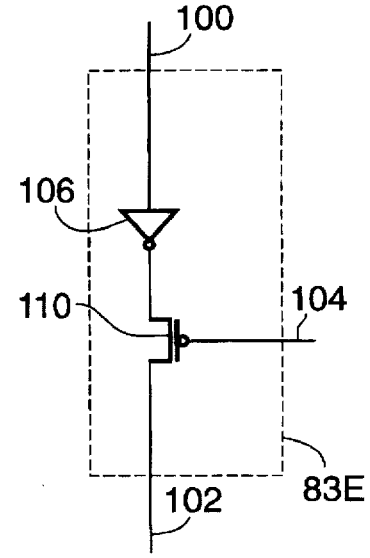
FIG. 9     FIG. 10     FIG. 11

ARRAY HAVING AN UPDATE CIRCUIT FOR UPDATING A STORAGE LOCATION WITH A VALUE STORED IN ANOTHER STORAGE LOCATION

BACKGROUND OF THE INVENTION

1. Field of the Invention

This invention is related to the field of microprocessors and, more particularly, to an array update circuit.

2. Description of the Relevant Art

Modern microprocessors are often classified as either superpipelined or superscalar. Superpipelined microprocessors achieve high performance by dividing the processing of instructions into a large number of sequential pipeline stages. Each stage performs a portion of the actions involved in instruction processing, i.e. fetching the instruction from memory, decoding the instruction, fetching operands for the instruction, executing the instruction, and storing the results. One or more sequential stages may be employed to perform each action. By dividing instruction processing into many small portions, an extremely short clock cycle may be achieved.

Conversely, superscalar microprocessors achieve high performance by executing multiple instructions per clock cycle and by choosing the shortest possible clock cycle consistent with the design. Superscalar microprocessors typically include pipelining, but often employ substantially fewer pipeline stages than superpipelined microprocessors. As used herein, the term "clock cycle" refers to an interval of time accorded to various stages of an instruction processing pipeline. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively.

Branch prediction is important to the performance of both superscalar and superpipelined microprocessors. When a branch instruction is executed, the microprocessor selects a memory address from which subsequent instructions are fetched and executed. Typically, one of two memory addresses is selected: the sequential address, which is the address of the byte immediately subsequent to the branch instruction in memory; or the target address, which is an address specified by the branch instruction. If the sequential address is selected, the branch is said to be "not taken". Conversely, the branch is said to be "taken" if the target address is selected. Because the branch instruction determines which instruction is to be executed following the branch instruction, subsequent instructions cannot be deterministically fetched until the branch instruction is executed. However, in order to increase performance, the selected direction is predicted. Instructions are fetched and executed according to the predicted direction. If the prediction is correct, performance is increased. If the prediction is incorrect, the predicted instructions are discarded and the correct instructions fetched.

Branch prediction mechanisms typically store branch prediction information used to predict the direction selected by branch instructions. The branch prediction information associated with a particular branch instruction is typically stored such that when a group of instructions including the particular branch instruction are fetched from an instruction cache, the branch prediction information is retrieved as well. The information may be stored in the instruction cache along with the instructions, or may be stored in a separate storage structure. Branch prediction information includes a value indicative of the selected direction during one or more previous executions of the branch instruction. The value is used to predict the selected direction of the current execution of the branch instruction. For example, a branch history value may be stored. The branch history value includes a plurality of bits. Each bit is indicative of the selected direction for a particular prior execution of the branch instruction. When the branch instruction is executed, the selected direction is added to the branch history value, and the bit indicative of the oldest prior execution is discarded. In this manner, an N-bit branch history stores the selected direction of the N most recent executions of the branch instruction. Additionally, the target address may be stored and used as the fetch address if the branch is predicted taken.

In order to increase performance, the branch prediction is performed at or near the time at which the corresponding branch instruction is fetched. The branch prediction is validated when the corresponding branch instruction is executed, or thereafter. The branch prediction information is then updated in accordance with the result of executing the branch instruction. Typically, the branch prediction information is updated after the corresponding branch instruction is determined to be no longer speculative. An instruction is speculative if it is not known to be executed according to the sequential execution of instructions in a program. A speculative instruction may not be executed due to a prior mispredicted branch or exception-causing instruction. For superscalar microprocessors, for example, branch prediction information is typically updated when the branch instruction is retired. If the prediction information were updated earlier, then updates may occur for branch instructions which were incorrectly executed. The branch prediction information may thereby become corrupted.

Unfortunately, updating branch prediction information significantly later than the prediction is made may lead to performance degradation. For example, a loop of code (i.e. an instruction sequence comprising one or more instructions terminated by a branch instruction with a target address defined as the first instruction in the sequence) may be executed a constant number of times. The constant may be defined by a register value which is decremented each time the branch instruction is executed, whereby the branch is taken until the register value equals zero. The branch history value included in the branch prediction information may be used to predict, when the branch instruction is fetched, that the register value will equal zero when the branch instruction is executed. If the loop includes only a few instructions and the branch is predicted taken, the loop of instructions may be fetched many times prior to retiring the branch instruction from a particular iteration of the loop. The instructions fetched between the particular iteration and the retirement of the corresponding branch instruction receive branch prediction information associated with an execution of the branch instruction prior to the particular iteration. The branch prediction information is incorrect since it does not reflect at least one execution of the branch instruction. When the loop instructions are fetched for the iteration in which the branch prediction should be "not taken", the branch prediction information is not updated to provide that prediction. Instructions are erroneously fetched from the body of the loop again, instead of from the sequential address. A mechanism for speculatively updating branch prediction information without corrupting the branch prediction information is desired.

SUMMARY OF THE INVENTION

The problems outlined above are in large part solved by a memory in accordance with the present invention. The memory includes first storage circuits for storing a plurality of first values and second storage circuits for storing a plurality of second values. The first value may be retired branch prediction information, while the second value may be speculative branch prediction information. The speculative branch prediction information is updated when the corresponding instructions are fetched, and the retired branch prediction value is updated when the corresponding branch instruction is retired. The speculative branch prediction information is used to form branch predictions. Advantageously, the speculatively fetched and executed branches influence subsequent branch predictions. The branch prediction algorithm may thereby be more accurately applied to the subsequent branch instructions than was previously achievable. Performance of a microprocessor employing the memory as a branch prediction array may be increased to the extent that the branch predictions are more accurate using the speculative predictions.

Upon detection of a mispredicted branch or an instruction which causes an exception, the speculative branch prediction information is updated to the corresponding retired branch prediction information. An update circuit is coupled between the first and second storage circuits for transmitting the updated information upon assertion of a control signal. The control signal may be asserted to cause the update of each speculative branch prediction by the corresponding retired branch prediction. The updates occur substantially simultaneously, restoring any corruption to speculative branch predictions due to speculatively fetched branch instructions which were flushed from the instruction processing pipeline. Advantageously, valid branch prediction information is restored.

Although discussed herein in terms of a branch prediction array, the memory may be adapted to myriad other applications. Any information which may be updated speculatively and would benefit from restoration when speculation is incorrect may advantageously employ the memory described herein.

Broadly speaking, the present invention contemplates a memory comprising a first storage circuit, a second storage circuit, and an update circuit. The first and second storage circuits are each configured to store at least one bit. The update circuit, comprising an input conductor, an output conductor, and a control conductor, is coupled to the first and second storage circuits. The update circuit is configured to transmit the bit stored within the first storage circuit upon the output conductor when a control signal upon the control conductor is asserted. Additionally, the update circuit is configured to inhibit transmittal of the bit stored within the first storage circuit when the control signal is deasserted. The second storage circuit is coupled to store the bit transmitted upon the output conductor.

The present invention further contemplates a memory comprising a first RAM cell, a second RAM cell, and an update circuit. The first RAM cell is configured to store at least one bit, and includes a first node upon which a first voltage indicative of a complement of the bit stored within the first RAM cell is conveyed. Similarly, the second RAM cell is configured to store at least one bit, and includes a second node upon which a second voltage indicative of a true value of the bit stored within the second RAM cell is conveyed. Coupled between the first node and the second node, the update circuit comprises an input conductor coupled to the first node, an output conductor coupled to the second node, and a control conductor configured to convey a control signal. The input conductor is electrically coupled to the output conductor if the control signal is asserted. Conversely, the input conductor is electrically isolated from the output conductor if the control signal is deasserted. The update circuit thereby updates the second node according to the first voltage if the control signal is asserted.

The present invention additionally contemplates a branch prediction array comprising a first plurality of storage locations, a second plurality of storage locations, and a plurality of update circuits. The first plurality of storage locations is configured to store speculative branch information. Conversely, the second plurality of storage locations is configured to store retired branch prediction information. Each of the plurality of update circuits is coupled between one of the first plurality of storage locations and one of the second plurality of storage locations. Furthermore, the plurality of update circuits are coupled to receive a control signal and are configured to update the first plurality of storage locations with values stored in the second plurality of storage locations upon assertion of the control signal. Additionally, the plurality of update circuits are configured to inhibit update of the first plurality of storage locations upon deassertion of the control signal.

The present invention still further contemplates a method for maintaining speculative and non-speculative copies of a plurality of values within an array, comprising several steps. The speculative copies of the plurality of values are updated according to the speculative execution of instructions. The non-speculative copies of the plurality of values are updated according to the retirement of instructions. Finally, the non-speculative copies of the plurality of values are copied into the speculative copies of the plurality of values according to a control signal asserted to the array.

BRIEF DESCRIPTION OF THE DRAWINGS

Other objects and advantages of the invention will become apparent upon reading the following detailed description and upon reference to the accompanying drawings in which:

FIGS. 7 through 11 are circuit diagrams depicting alternative embodiments of the update circuit shown in FIG. 6.

Figure 1:
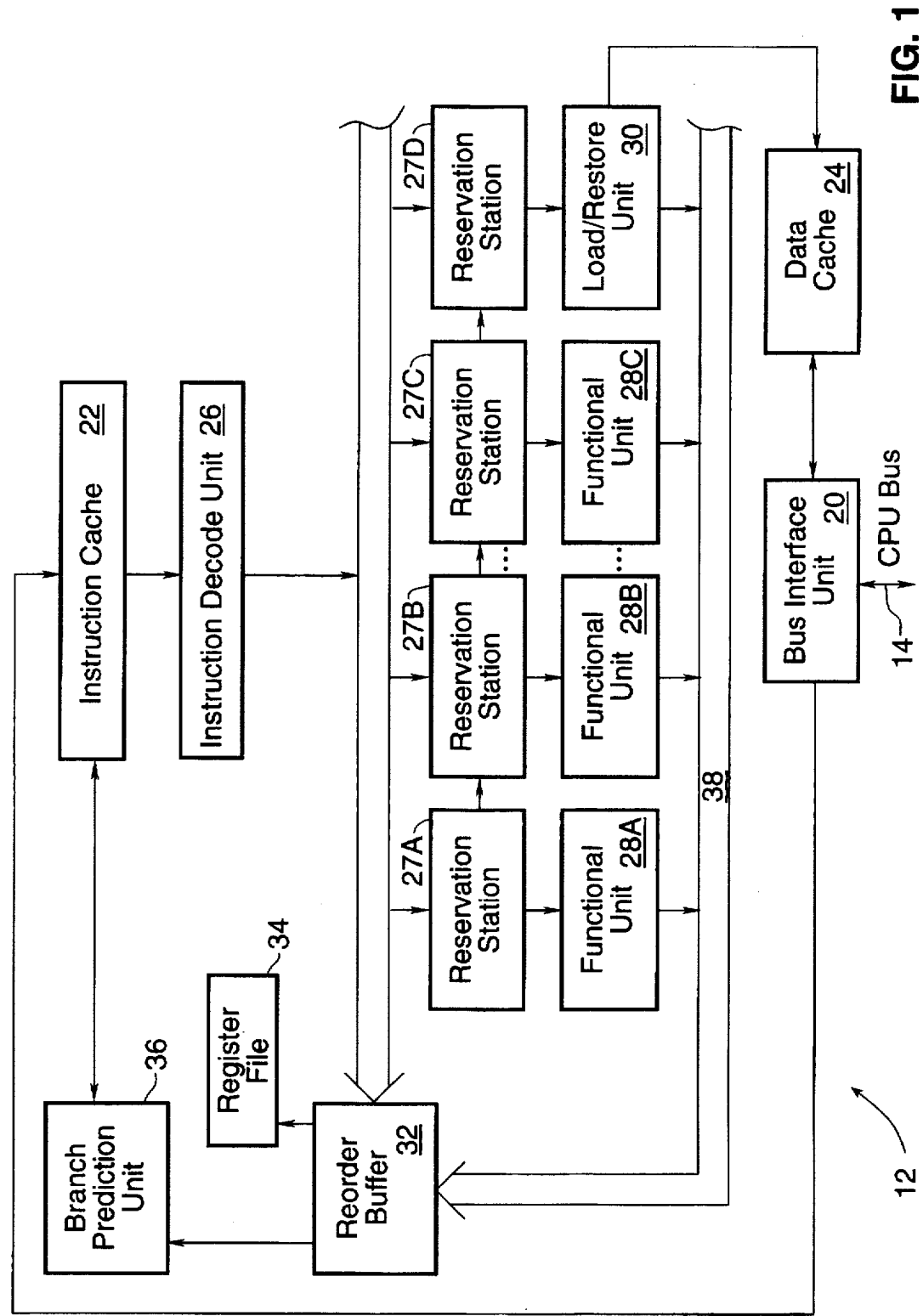
FIG. 1 is a block diagram of a superscalar microprocessor including a branch prediction unit, functional units, an instruction cache and a reorder buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a superscalar microprocessor 12 is shown. Microprocessor 12 includes a bus interface unit 20, an instruction cache 22, a data cache 24, an instruction decode unit 26, a plurality of reservation stations 27A–27D, a plurality of functional units 28A–28C, a load/store unit 30, a reorder buffer 32, a register file 34, and a branch prediction unit 36. The plurality of functional units will be collectively referred to herein as functional units 28, and the plurality of reservation stations will be collectively referred to as reservation stations 27. Bus interface unit 20 is coupled to instruction cache 22, data cache 24, and a CPU bus 14. Instruction cache 22 is further coupled to branch prediction unit 36 and to instruction decode unit 26, which is in turn coupled to reservation stations 27, reorder buffer 32, and register file 34. Reservation stations 27A–27C are coupled to respective functional units 28A–28C, and reservation station 27D is coupled to load/store unit 30. Reorder buffer 32, reservation stations 27, functional units 28, and load/store unit 30 are each coupled to a result bus 38 for forwarding of execution results. Load/store unit 30 is coupled to data cache 24. Finally, reorder buffer 32 is coupled to branch prediction unit 36.

Generally speaking, branch prediction unit 36 is configured to predict branch instructions fetched by instruction cache 22 during a clock cycle Instruction cache 22 receives the branch prediction and fetches instructions from the predicted address for subsequent dispatch and execution. Branch prediction unit 36 maintains speculative and non-speculative copies of the branch prediction information. Upon predicting the address, branch prediction unit 36 updates the speculative branch prediction information associated with the predicted branch. The speculative branch prediction information is used to form subsequent predictions. The speculative branch prediction information is updated assuming that the prediction (taken or not taken) is correct.

The non-speculative branch prediction information is updated as branch instructions are retired. When a mispredicted branch or exception-causing instruction is retired, the non-speculative branch prediction information associated with each branch instruction predicted by branch prediction unit 36 is copied into the corresponding speculative branch prediction information. The speculative branch prediction information is thereby corrected for any corruption introduced by speculative updates which were later flushed from the instruction processing pipeline. Advantageously, the speculatively updated branch prediction information is used to form predictions, accurately reflecting the instructions which have been speculatively fetched and executed. However, when instructions are flushed from microprocessor 12, the branch prediction information is updated to a non-speculative state.

Instruction cache 22 is a high speed cache memory for storing instructions. It is noted that instruction cache 22 may be configured into a set-associative or direct-mapped configuration. Instructions are fetched from instruction cache 22 and conveyed to instruction decode unit 26 for decode and dispatch to an execution unit.

In the embodiment shown, instruction decode unit 26 decodes each instruction fetched from instruction cache 22. Instruction decode unit 26 dispatches each instruction to a reservation station 27A–27D coupled to an execute unit 28 or load/store unit 30 which is configured to execute the instruction. Instruction decode unit 26 also detects the register operands used by the dispatched instructions and requests these operands from reorder buffer 32 and register file 34. In one embodiment, functional units 28 are symmetrical execution units. Symmetrical execution units are each configured to execute a particular subset of the instruction set employed by microprocessor 12. The subsets of the instruction set executed by each of the symmetrical execution units are the same. In another embodiment, functional units 28 are asymmetrical execution units configured to execute dissimilar instruction subsets. For example, functional units 28 may include a branch execute unit for executing branch instructions, one or more arithmetic/logic units for executing arithmetic and logical instructions, and one or more floating point units for executing floating point instructions. Instruction decode unit 26 dispatches an instruction to an execute unit 28 or load/store unit 30 which is configured to execute that instruction. As used herein, the term "dispatch" refers to conveying an instruction to an appropriate execution unit or load/store unit for execution of the instruction.

Load/store unit 30 provides an interface between functional units 28 and data cache 24. Load and store memory operations are performed by load/store unit 30 to data cache 24. Additionally, memory dependencies between load and store memory operations are detected and handled by load/store unit 30.

Reservation stations 27 are provided for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 26, functional units 28, and load/store unit 30. Such an embodiment may perform the dispatch function within the centralized reservation station.

Microprocessor 12 supports out of order execution, and employs reorder buffer 32 for storing execution results of speculatively executed instructions and storing these results into register file 34 in program order, for performing dependency checking and register renaming, and for providing for mispredicted branch and exception recovery. When an instruction is decoded by instruction decode unit 26, requests for register operands are conveyed to reorder buffer 32 and register file 34. In response to the register operand requests, one of three values is transferred to the reservation station 27 which receives the instruction: (1) the value stored in reorder buffer 32, if the value has been speculatively generated; (2) a tag identifying a location within reorder buffer 32 which will store the result, if the value has not been speculatively generated; or (3) the value stored in the register within register file 34, if no instructions within reorder buffer 32 modify the register. Additionally, a storage location within reorder buffer 32 is allocated for storing the results of the instruction being decoded by instruction decode unit 26. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When functional units 28 or load/store unit 30 execute an instruction, the tag assigned to the instruction by reorder buffer 32 is conveyed upon result bus 38 along with the result of the instruction. Reorder buffer 32 stores the result in the indicated storage location. Additionally, reservation stations 27 compare the tags conveyed upon result bus 38 with tags of operands for instructions stored therein. If a match occurs, the unit captures the result from result bus 38 and stores it with the corresponding instruction. In this manner, an instruction may receive the operands it is intended to operate upon. Capturing results from result bus 38 for use by instructions is referred to as "result forwarding".

Instruction results are stored into register file 34 by reorder buffer 32 in program order. Storing the results of an instruction and deleting the instruction from reorder buffer 32 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 32 discards the instructions subsequent to that instruction. Instructions thus discarded are also flushed from reservation stations 27, functional units 28, load/store unit 30, and instruction decode unit 26.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Serial No. 08/146,382, filed Oct. 29, 1993 by Witt, et al. These documents are incorporated herein by reference in their entirety.

Register file 34 includes storage locations for each register defined by the microprocessor architecture employed by microprocessor 12. For example, microprocessor 12 may employ the x86 microprocessor architecture. For such an embodiment, register file 34 includes locations for storing the EAX, EBX, ECX, EDX, ESI, EDI, ESP, and EBP register values.

Data cache 24 is a high speed cache memory configured to store data to be operated upon by microprocessor 12. It is noted that data cache 24 may be configured into a set-associative or direct-mapped configuration.

Bus interface unit 20 is configured to effect communication between microprocessor 12 and devices coupled to CPU bus 14. For example, instruction fetches which miss instruction cache 22 may be transferred from main memory by bus interface unit 20. Similarly, data requests performed by load/store unit 30 which miss data cache 24 may be transferred from main memory by bus interface unit 20. Additionally, data cache 24 may discard a cache line of data which has been modified by microprocessor 12. Bus interface unit 20 transfers the modified line to main memory.

It is noted that instruction decode unit 26 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 24, executing the instruction, and transferring the result to memory (if the destination operand is a memory location). Load/store unit 30 performs the memory transfers, and an execute unit 28 performs the execution of the instruction. As an alternative to FIG. 1, load/store unit 30 may include a load/store buffer for load and store instructions as opposed to reservation station 27D. Functional units 28 may calculate the memory addresses, and load/store unit 30 performs the memory accesses.

Although microprocessor 12 as shown in FIG. 1 is a superscalar microprocessor, superpipelined microprocessors are also contemplated within the spirit and scope of the present invention.

Figure 2:
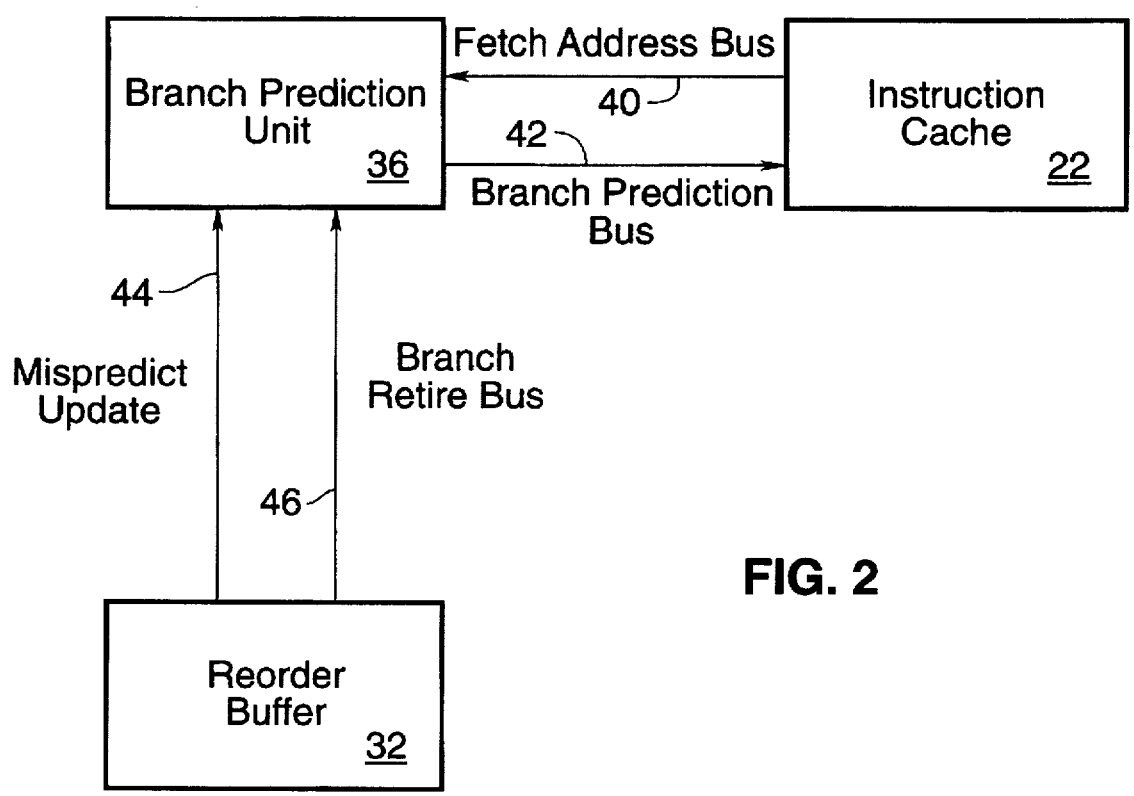
FIG. 2 is a block diagram of the branch prediction unit, functional units, instruction cache, and reorder buffer shown in FIG. 1. Interconnections between the units are also shown.

Turning now to FIG. 2, a block diagram of portions of microprocessor 12 is shown to highlight interconnections according to one embodiment of microprocessor 12. Branch prediction unit 36, instruction cache 22, and reorder buffer 32 are shown in FIG. 2. A fetch address bus 40 and a branch prediction bus 42 are coupled between instruction cache 22 and branch prediction unit 36. A mispredict update conductor 44 and a branch retire bus 46 are coupled between reorder buffer 32 and branch prediction unit 36.

Instructions are fetched from instruction cache 22 according to a fetch address. The fetch address is concurrently conveyed to branch prediction unit 36 upon fetch address bus 40. Branch prediction unit 36 uses the fetch address to select speculative branch prediction information associated with the instructions being fetched. Branch prediction unit 36 performs a branch prediction according to the selected branch prediction information, and returns the predicted branch target address (or an indication of sequential address) to instruction cache 22 upon branch prediction bus 42. Additionally, branch prediction unit 36 updates the speculative branch prediction information to reflect the prediction. A subsequent fetch to the same fetch address thereby uses branch prediction information which reflects the speculatively fetched instructions. For example, if the branch prediction information includes a branch history value, the branch history indicates a taken branch for the most recent execution of the corresponding branch instruction if the prediction is taken. Alternatively, the branch history indicates a not-taken branch for the most recent execution of the branch instruction if the prediction is not-taken.

During clock cycles in which reorder buffer 32 retires a branch instruction, the non-speculative branch prediction information corresponding to the branch instruction is updated. Reorder buffer 32 conveys the memory address at which the branch instruction is stored upon branch retire bus 46 to branch prediction unit 36, along with the actual taken/not-taken status of the branch instruction (i.e. the status generated by correctly executing the branch instruction). Branch prediction unit 36 updates the corresponding non-speculative branch prediction information according to the actual taken/not-taken status. Because the non-speculative branch prediction information is updated at the retirement of branch instructions, the non-speculative branch prediction information is referred to herein as "retired branch information".

When a mispredicted branch instruction or an instruction which caused an exception is retired, a signal is asserted by reorder buffer 32 upon mispredict update conductor 44. Branch prediction unit 36 updates each speculative branch prediction information with the corresponding retired branch prediction information. In this manner, branch prediction information which was corrupted by speculative branches which were incorrectly fetched and/or executed is recovered to a non-speculative, non-corrupted state.

Figure 3:
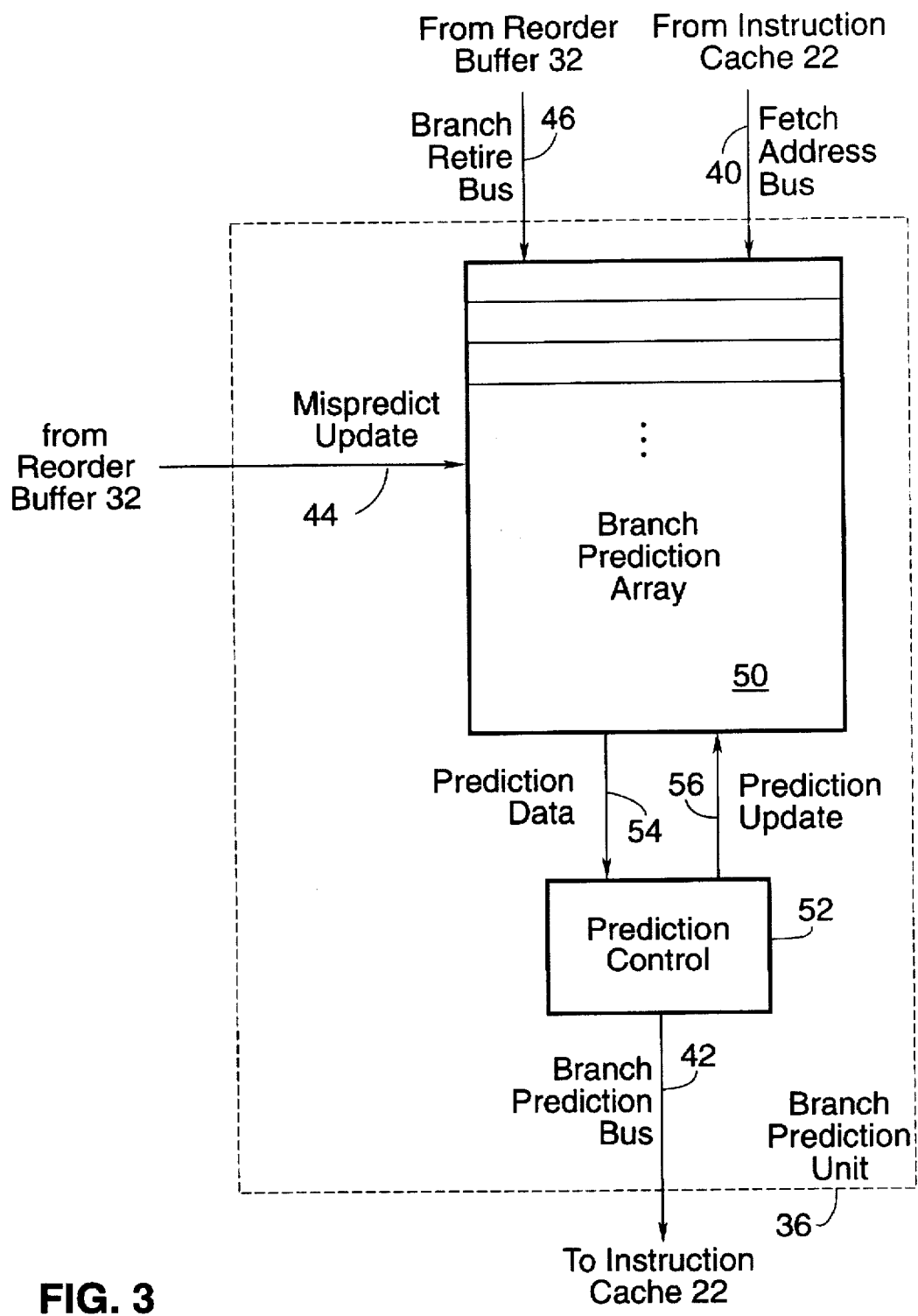
FIG. 3 is a block diagram of the branch prediction unit shown in FIGS. 1 and 2, including a branch prediction array.

Turning next to FIG. 3, a block diagram of one embodiment of branch prediction unit 36 is shown. Branch prediction unit 36 includes a branch prediction array 50 and a prediction control unit 52. Fetch address bus 40, branch retire bus 46, and mispredict update conductor 44 are coupled to branch prediction array 50. Prediction control unit 52 is coupled to branch prediction bus 42. Between branch prediction array 50 and prediction control unit 52 are coupled a prediction data bus 54 and a prediction update bus 56.

Branch prediction array 50 comprises a plurality of storage locations. Each storage location includes sufficient storage for storing branch prediction information (both speculative and retired copies). Fetch address bus 40 is used as an index into branch prediction array 50 for selecting the branch prediction information to be used to form the associated branch prediction. Branch prediction information is therefore stored into branch prediction array 50 according to the address at which the corresponding branch instruction is stored. Fetch address bus 40 is connected to a read port upon branch prediction array 50. The selected speculative branch prediction information is conveyed to prediction control unit 52 upon prediction data bus 54.

Prediction control unit 52 uses the branch prediction information received upon prediction data bus 54 to form a branch prediction. The branch prediction address is conveyed to instruction cache 22 upon branch prediction bus 42. It is noted that many branch prediction mechanisms are well known in the art, and any suitable branch prediction mechanism may be employed by prediction control unit 52. For example, if the branch history value described above is employed, then prediction control unit 52 may determine the branch prediction by using the history to determine the most likely taken/not-taken response.

Prediction control unit 52 additionally updates the branch prediction information in light of the prediction generated. For example, if the branch prediction information includes a branch history value, the predicted taken/not taken indication is added to the branch history value and the least recent taken/not taken indication within the branch history value is discarded. The updated branch prediction information is conveyed to branch prediction array 50 upon prediction update bus 56. Prediction update bus 56 is coupled to a write port upon branch prediction array 50 such that the updated branch prediction information is written into branch prediction array 50.

Branch retire bus 46 is coupled to a second write port upon branch prediction array 50. The retired branch prediction information is updated via writes upon the second write port. Although branch prediction array 50 includes two write ports, it is noted that branch prediction array 50 is not truly dual-write ported. One write port updates only retired branch prediction information, while the other write port updates only speculative branch prediction information. Branch prediction array 50 is configured such that the speculative and retired portions of each storage location are accessed separately by the two write ports. Furthermore, the read port and the first write port access the same speculative storage location. Additionally, mispredict update conductor 44 is coupled to a control line input upon branch prediction array 50. When the control line input is asserted, branch prediction array 50 copies the retired branch prediction information to the speculative branch prediction information. Multiple entries within branch prediction array 50 may have been corrupted by instructions fetched subsequent to the mispredicted branch instruction or instruction that causes an exception. Therefore, each entry (or storage location) updates the speculative branch prediction information to the retired branch prediction information. The updates occur substantially simultaneously upon assertion of the control line input of branch prediction array 50.

It is noted that, although branch prediction array 50 is shown as a separate structure from instruction cache 22, other embodiments of microprocessor 12 may incorporate branch prediction array 50 into instruction cache 22. Additionally, the branch prediction logic in prediction control unit 52 may be incorporated into instruction cache 22.

Figure 4:
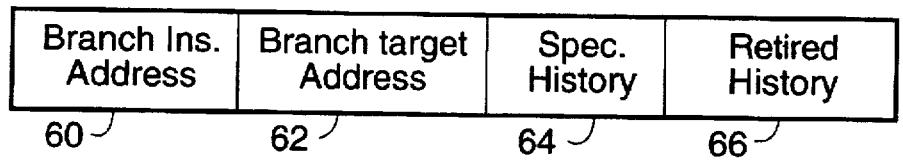
FIG. 4 is a diagram of branch prediction information stored within the branch prediction array shown in FIG. 3.

Turning now to FIG. 4, one embodiment of the branch prediction information 61 stored in branch prediction array 50 is shown. The branch prediction information 61 includes a branch instruction address field 60, a branch target address field 62, a speculative branch history field 64, and a retired branch history field 66. Branch instruction field 60 stores the address of the branch instruction corresponding to the branch target address stored in branch target address field 62. Branch instruction field 60 is included in cases where branch prediction array 50 does not include a storage location corresponding to each cache line in instruction cache 22, to cause branch prediction unit 36 not to form a prediction using a target address associated with a different line of instructions. If branch prediction array 50 does include a storage location corresponding to each line in instruction cache 22, then branch instruction address field 60 may be eliminated. Speculative history field 64 stores the speculatively generated branch history value, while retired history field 66 stores the retired branch history value.

Figure 5:
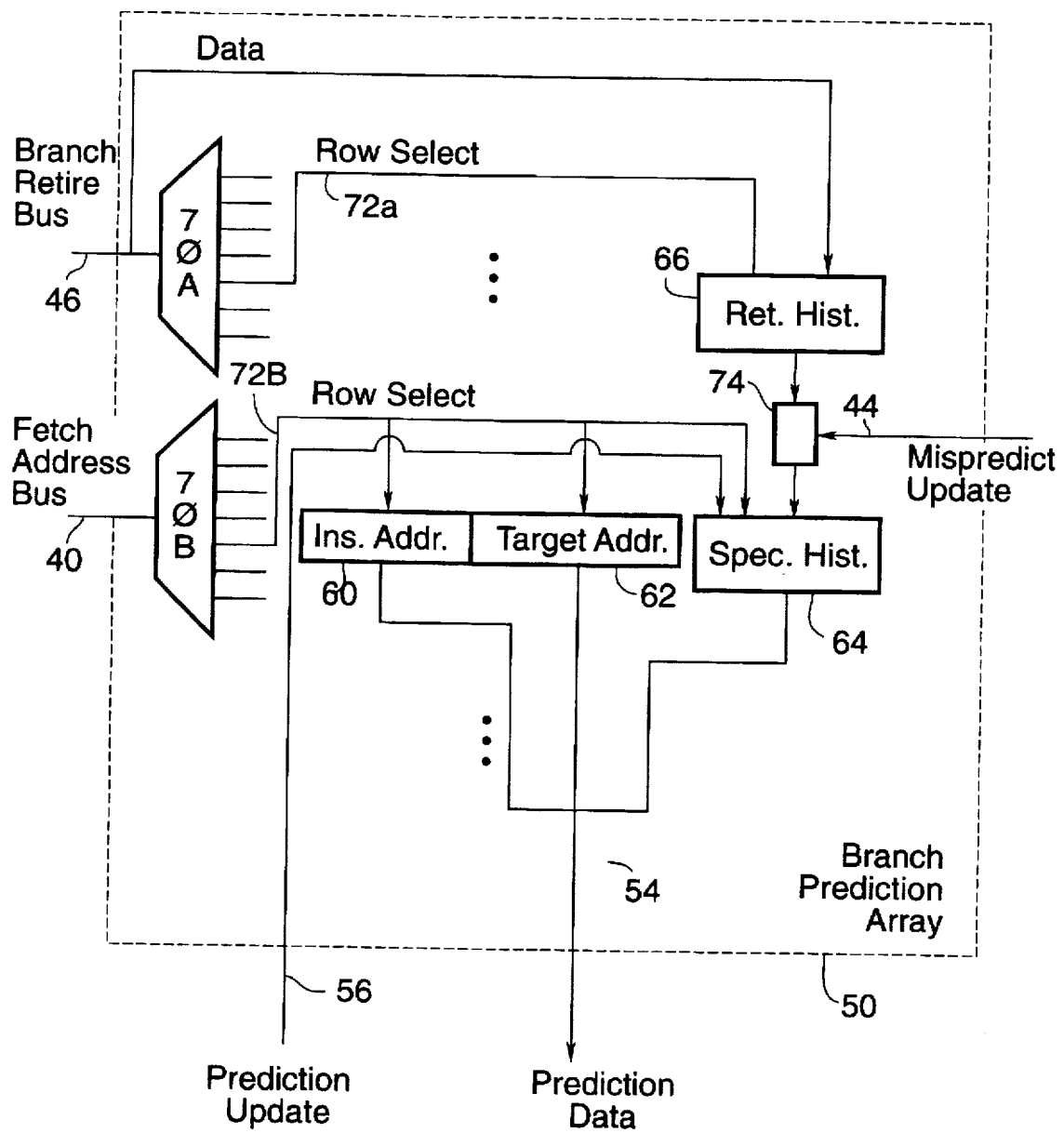
FIG. 5 is a block diagram of one entry within the branch prediction array shown in FIG. 3.

Turning now to FIG. 5, one embodiment of branch prediction array 50 is shown in block diagram form. One storage location within branch prediction array 50 is shown, to illustrate the structure of the storage location and its connection to the various read and write ports. Branch retire bus 46 and fetch address bus 40 are respectively coupled to decoder circuits 70A and 70B. Decoder circuits 70 decode a portion of the addresses conveyed upon the respective buses, activating a particular row select line dependent upon the address value. Row select lines 72A and 72B are shown in FIG. 5 as selecting portions of the storage location shown. Other row select lines (not shown) select other storage locations (not shown).

Since fetch address bus 40 is coupled to a read port, the storage location selected by decoder 70B conveys a value upon prediction data bus 54. In the embodiment shown, therefore, the values stored in branch instruction address field 60, branch target address field 62, and speculative history field 64 are conveyed upon prediction data bus 54. Similarly, branch retire bus 46 updates the portion of the storage location corresponding to retired history field 66. The storage location is selected by decoder circuit 70A. Prediction update bus 56 updates the portion of the storage location selected by fetch address bus 40 which corresponds to speculative history field 64. In other embodiments, branch retire bus 46 may additionally update branch instruction address field 60 and branch target address field 62 upon detection of a branch instruction not predicted by branch prediction unit 36.

Mispredict update conductor 44 is also shown in FIG. 5 coupled to an update circuit 74. As used herein, an update circuit refers to a circuit having an input bus, an output bus, and a control conductor. The update circuit transmits the value conveyed on the input bus upon the output bus when a signal upon the control conductor is asserted. When the signal upon the control conductor is not asserted, the update circuit inhibits transmittal of the value on the input bus. Update circuit 74 is coupled such that the control conductor is mispredict update conductor 44, the input bus is coupled to retired history field 66 of the storage location, and the output bus is coupled to the speculative history field 64 of the storage location. Each storage location within branch prediction array 50 includes a similar update circuit to update circuit 74, for updating the speculative branch history value to the retired branch history value upon detection of a branch misprediction.

Although the branch prediction array 50 includes a read/write port for fetch address bus 40 and prediction update bus 56 and a write port for branch retire bus 46, branch prediction array 50 may be constructed using a single port if branch retire bus 46 and fetch address bus 40 arbitrate for access to the single port.

Figure 6:
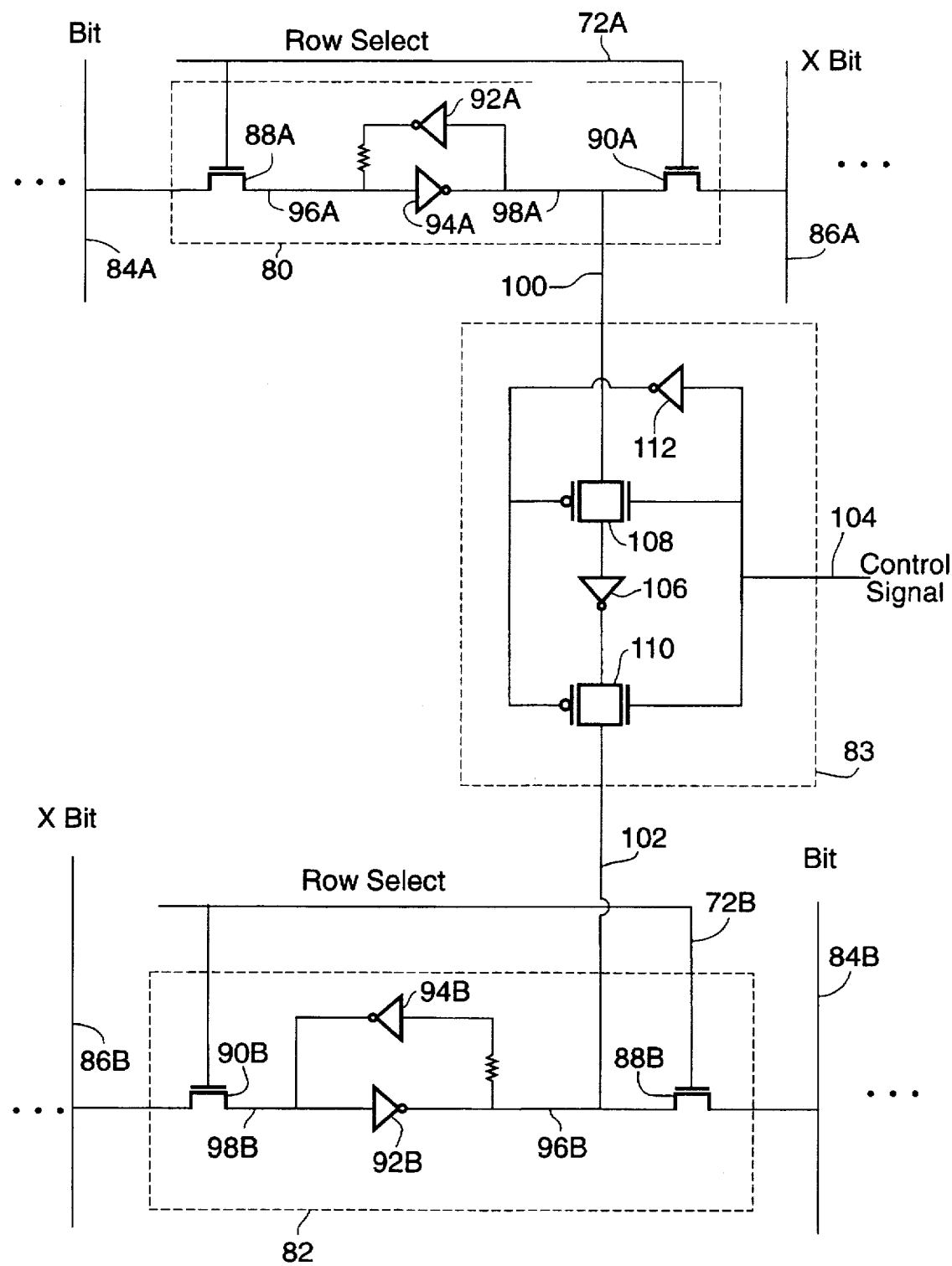
FIG. 6 is a circuit diagram of a bit of storage within the branch prediction array entry shown in FIG. 5, including an update circuit.

Turning now to FIG. 6, a circuit diagram showing a first storage circuit 80, a second storage circuit 82, and an update circuit 83 are shown according to one embodiment of the present invention. Storage circuits 80 and 82 are configured to store a single bit as shown in FIG. 6. In the configuration shown, storage circuit 80 may store a bit of the retired branch prediction information and storage circuit 82 may store a bit of the speculative branch prediction information referred to above. Additional bits of the retired and speculative branch prediction information may be stored in similar storage circuits, as indicated by the ellipses in FIG. 6. Additional update circuits similar to update circuit 83 are coupled between the additional storage circuits. Generally speaking, a storage circuit is configured to store one or more bits of information. The storage circuit may be read or written by asserting a control input to the storage circuit.

In the embodiment shown in FIG. 6, storage circuits 80 and 82 each comprise a random access memory (RAM) cell having corresponding control inputs connected to row select conductors 72A and 72B. Other embodiments of storage circuit 80 and 82 may comprise multiple RAM cells, or other types of storage devices such as registers. RAM cells are typically arranged into columns connected to a pair of conductors. A particular cell in the column is selected via a row select control line, and the contents of the selected RAM cell are read or written. If the pair of conductors are being actively charged when the row select control line is asserted, then the RAM cell is written. Conversely, the RAM cell is read if the pair of conductors are not being actively charged when the row select control line is asserted. The pair of conductors used for reading and writing the RAM cell are typically referred to as the bit and xbit (or bit bar) conductors. Storage cell 80 is coupled to bit conductor 84A and xbit conductor 86A. Similarly, storage cell 82 is coupled to bit conductor 84B and xbit conductor 86B.

The circuits in FIG. 6 comprise Complementary Metal-Oxide-Semiconductor (CMOS) transistors. A CMOS transistor is a device having three terminals: a drain terminal, a source terminal, and a gate terminal. Current flows between the source and drain terminals when the voltage difference between the gate terminal and the source terminal exceeds a threshold value. For P-type CMOS (PMOS) transistors, current flows when the gate voltage is less than the source voltage by a threshold value. For N-type CMOS (NMOS) transistors, current flows when the gate voltage is greater than the source voltage by a threshold value. Voltages upon CMOS transistors are limited to voltages between the power supply voltage supplied to the circuit and the ground voltage from which the power supply voltage is referenced. The power supply voltage is of greater potential than the ground voltage (i.e. the power supply voltage is positive with respect to the ground voltage). For the storage circuits shown in FIG. 6, the power supply voltage is assigned a logical one value and the ground voltage is assigned a logical zero value.

The RAM cell within storage circuit 80 includes a pair of NMOS transistors 88A and 90A and a pair of cross-coupled inverters 92A and 94A. Inverters are said to be cross-coupled when the output node of each inverter is coupled to the input node of the other inverter. Cross-coupled inverters create a stable loop which actively maintains a stored value until overwritten by an external source. For example, if a node 96A between NMOS transistor 88A and the pair of cross coupled inverters is at the power supply voltage, a node 98A between NMOS transistor 90A and the cross-coupled inverters is at the ground voltage due to the inversion produced by inverter 94A. Because the input of inverter 92A is at the ground voltage, inverter 92A maintains the power supply voltage upon node 96A. Nodes 96A and 98A maintain opposite voltages (one at the power supply voltage and the other at the ground voltage). The logical value stored in the RAM cell is represented by the voltage upon node 96A and the logical opposite of the value is represented by the voltage upon node 98A. The logical value stored in the RAM cell is referred to herein as the "true" value, and the logical opposite of the value is referred to herein as the "complement" value.

The RAM cell of storage circuit 82 is similar to the RAM cell within storage circuit 80. Therefore, the elements of the RAM cell of storage circuit 82 are assigned reference numbers similar to the reference numbers of the RAM cell of storage circuit 80, with the letter "B" following the reference number instead of the letter "A".

Update circuit 83 is coupled between node 98A and node 96B. Using update circuit 83, the value stored in storage circuit 82 may be updated to the value stored in storage circuit 80 without requiring access to a port upon the array including the storage circuits. Update circuit 83 includes an input conductor 100 coupled to node 98A, an output conductor 102 coupled to node 96B, and a control conductor 104 (or a control line). As shown in FIG. 5, control conductor 104 is coupled to mispredict update conductor 44. When a control signal upon control conductor 104 is asserted, update circuit 83 transmits the value conveyed upon input conductor 100 to conductor 102. When the control signal is deasserted, update circuit 83 inhibits the transmittal of the value conveyed upon conductor 100 to conductor 102.

Update circuit 83 receives the complement of the value stored in storage circuit 80 upon input conductor 100, and output conductor 102 is coupled to node 96B (the true value of storage circuit 82). In order to update the value stored in storage circuit 82 with the value stored in storage circuit 80, the transmitted value must be inverted. During the transmission of the value, update circuit 83 logically inverts the value using inverter 106. Inverter 106 is capable of a greater current flow than inverter 92B in order to overwrite the value stored in storage circuit 82. Inverter 106 thereby charges (or discharges) node 96B despite an opposite charging action which may be applied by inverter 92B. Although any current driving capability within inverter 106 which may charge or discharge node 96B is suitable, an inverter having 1.5 times the current capability of inverter 92B may be suitable in one exemplary embodiment.

A pair of transmission gates 108 and 110 are additionally included within update circuit 83. A transmission gate functions as a switch, allowing a value to pass through the gate when a control input is asserted and inhibiting the value from passing through when the control input is not activated. Transmission gates 108 and 110 comprise a PMOS and NMOS transistor coupled in parallel. The gate of the NMOS transistor is coupled directly to control conductor 104, while the gate of the PMOS transistor receives an inverted version of the control signal through inverter 112. In this manner, both the PMOS transistor and NMOS transistor of the transmission gate may be activated via a control signal upon control conductor 104. When the control signal is asserted to a logical one value, transmission gates 108 and 110 allow values to pass through. It is noted that, by connecting the gates of the NMOS transistors within transmission gates 108 and 110 to the output of inverter 112 and directly connecting the gates of the corresponding PMOS transistors to control conductor 104, update circuit 83 may transmit upon assertion to a logical zero value of the control signal. Inhibit of the transmission within such an embodiment is accomplished via deassertion of the control signal to a logical one value. It is noted that transmission gate 108 is not required for the functionality of update circuit 83. However, transmission gate 108 may reduce the capacitive loading upon node 98A. It is further noted that a transmission gate may be formed from an NMOS transistor coupled as shown in FIG. 6, without the corresponding PMOS transistor. Such an embodiment may delete inverter 112 as well. Alternatively, a PMOS transistor may be used without the corresponding NMOS transistor to form a transmission gate. Generally speaking, a transmission gate comprises at least one transistor coupled such that transmission of a voltage through the transmission gate occurs upon assertion of a control input and transmission of the voltage is inhibited upon deassertion of the control input.

The components of update circuit 83 thereby transmit the value stored in storage circuit 80 to storage circuit 82 upon assertion of the control signal on control conductor 104. The complement value stored in storage circuit 83 passes through transmission gate 108, is inverted to the true value stored in storage circuit 80 by inverter 106, passes through transmission gate 110, and overwrites the value stored in storage circuit 82. Advantageously, the update occurs without requiring access to the storage circuits in the conventional manner using row select lines 72 and bit and xbit conductors 84 and 86.

In order to read a value from the RAM cell within storage circuit 80, bit and xbit conductors 84A and 86A are precharged to the power supply voltage. For purposes of this explanation, node 96A is at the power supply voltage and node 98A is at the ground voltage. Subsequent to the precharge, row select conductor 72A is asserted to a high voltage. Because node 96A and bit conductor 84A are both at the power supply voltage, substantially no current flows through NMOS transistor 88A. However, node 98A is at the ground voltage. Therefore, current flows from xbit conductor 86A to node 98A. Inverter 94A receives the current flow in order to maintain the ground voltage upon node 98A. Because xbit conductor 86A is not actively driven during the read cycle, xbit conductor 86A is discharged toward the ground voltage. The difference between the voltage upon bit conductor 84A and xbit conductor 86A represents the logical one value stored within storage circuit 80. It is noted that bit conductor 84A is similarly discharged in the case where node 96A is at the ground voltage and node 98A is at the power supply voltage.

A senseamp circuit (not shown) is typically connected to bit conductor 84A and xbit conductor 86A for sampling the voltages thereon during a read cycle. The senseamp circuit is configured to detect the voltage difference between bit conductor 84A and xbit conductor 86A and to output a logical one or logical zero based upon which voltage level is higher. When bit conductor 84A is at a higher voltage than xbit conductor 86A, a logical one (power supply voltage) is output from the senseamp circuit. When bit conductor 84A is at a lower voltage than xbit conductor 86A, a logical zero is output from the senseamp circuit. Similarly, a senseamp circuit is connected to bit conductor 84B and xbit conductor 86B for detecting the value stored therein during a read cycle.

In order to store (or write) a value into the RAM cell of storage circuit 80, bit and xbit conductors 84A and 86A are charged to opposite voltages corresponding to the value to be stored into the RAM cell. For example, if a logical one is to be stored into the RAM cell, then bit conductor 84A is charged to the power supply voltage and xbit conductor 86A is discharged to the ground voltage. The row select line on row select conductor 72A is asserted while bit conductors 84A and 86A are actively charged to their respective voltages. The charging capability of the devices (not shown) charging conductors 84A and 86A are larger than the charging capabilities of inverters 92A and 94A. Therefore, node 96A is charged to the value upon bit conductor 84A and node 98A is charged to the value upon xbit conductor 86A. The value stored in the RAM cell is thereby changed to the desired value represented by voltages upon bit conductor 84A and xbit conductor 86A. It is noted that reads and writes to the RAM cell within storage circuit 82 operate similarly.

It is noted that storage circuit 82, when employed within branch prediction array 50, may be read and updated during a single clock cycle. The speculative branch prediction information is first read, then updated according to the associated branch prediction. Row select conductor 72B may be asserted for the read, and conductors 84B and 86B charged to reflect the value stored in storage circuit 82 (i.e. a read may be performed). Subsequent to the senseamp circuit sampling the value of storage circuit 82, conductors 84B and 86B may be driven to store a new value into storage circuit 82.

It is further noted that update circuit 83 as shown in FIG. 6 transmits an inversion of the value on input conductor 100 upon output conductor 102. Another embodiment of update circuit 83 is contemplated in which the an even number of series connected inverters are included within update circuit 83 in place of inverter 106. Update circuit 83, according to this embodiment, is connected between node 98A and 98B. Furthermore, any odd number of inverter circuits may be included in update circuit 83 in place of inverter 106, and the function of update circuit 83 is as described above.

Although the circuit of FIG. 6 has been described in terms of a branch prediction array, the circuit of FIG. 6 may be used in any memory in which a large number of values are copied from one storage location to another substantially simultaneously. For example, set-associative caches often employ a least recently used (LRU) replacement algorithm for choosing which cache line within the set is replaced upon a cache miss. An LRU value is stored with respect to each cache line. When a line in the set is accessed, that line becomes the most recently used line of the set. Other LRU values are updated such that each cache line in the set has a unique LRU value between most recently used and least recently used. If the cache is accessed speculatively, a cache line may be made the most recently used even though the access is not warranted according to the sequential execution of instructions. A cache using the circuit of FIG. 6 may store a speculative LRU updated at access time, and a retired LRU updated at retirement of instructions which access memory. When a mispredicted branch or exception-causing instruction is encountered, the retired LRU values may be globally copied to the corresponding speculatively LRU values substantially simultaneously.

Turning now to FIGS. 7 through 11, various embodiments of update circuit 83 (update circuits 83A–83E) are shown.

Update circuits 83A–83E show combinations of different types of transmission gates 108 and 110, and variations of update circuit 83 which do not include transmission gate 108. Other embodiments of update circuit 83 are contemplated as well. The spirit and scope of the appended claims are intended to encompass such embodiments. It is noted that the control signal conveyed upon control conductor 104 may be defined as "asserted" when a logical zero (or ground voltage) is conveyed for update circuits 83B and 83E.

Figure 12:
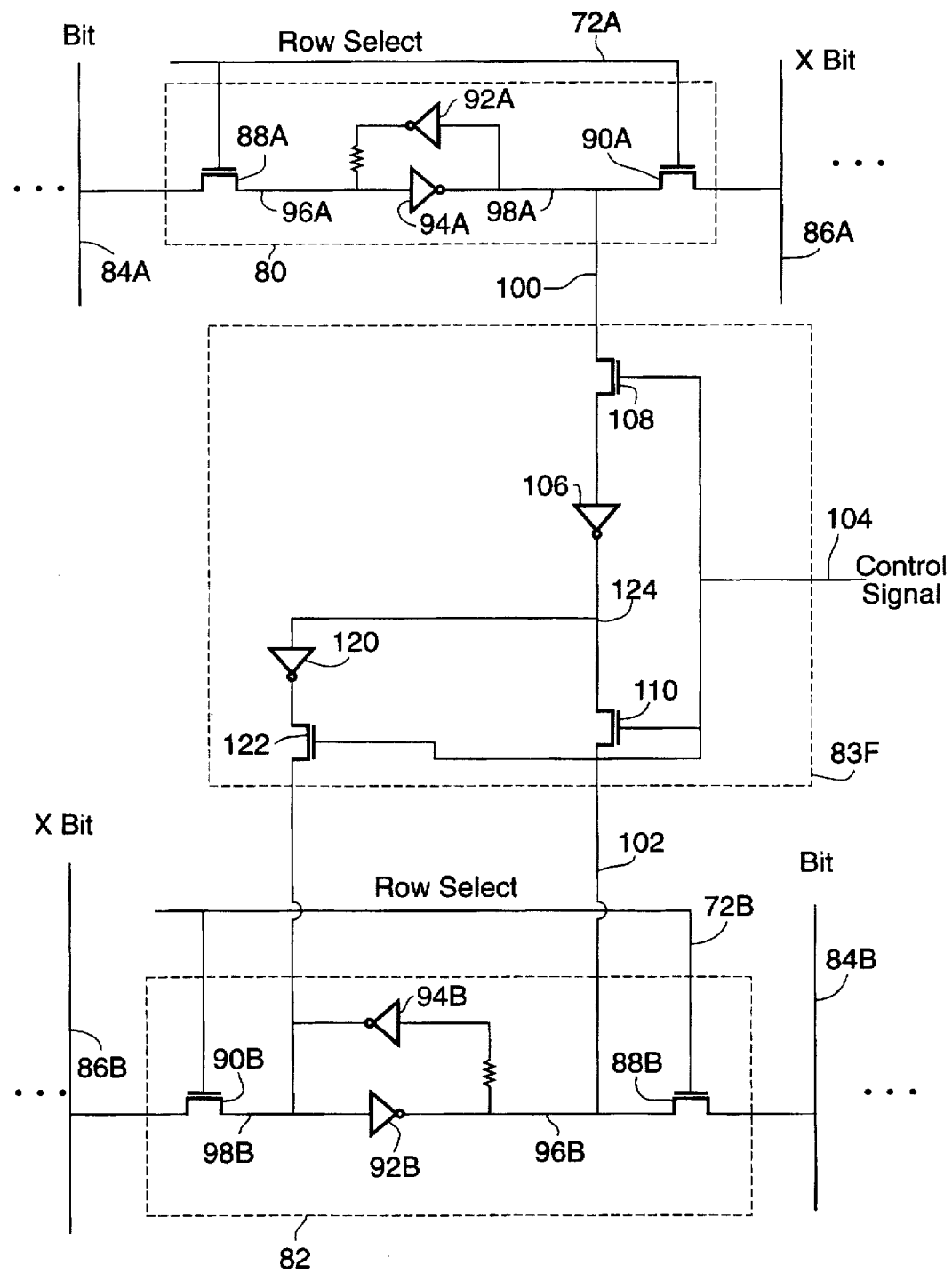
FIG. 12 is a circuit diagram of yet another embodiment of the circuitry shown in FIG. 6.

Turning now to FIG. 12, another embodiment of storage circuits 80 and 82 and an embodiment of update circuit 83F is shown. In this embodiment, inverter 106 and transmission gates 108 and 110 are included. Additionally, an inverter 120 and a transmission gate 122 are included. Inverter 120 is coupled between a node 124 (between inverter 106 and transmission gate 110) and transmission gate 122. Transmission gate 122 is coupled to control conductor 104, and is further coupled to node 98B within storage circuit 82. Inverter 120 inverts the logical value conveyed to node 96B and conveys that value to node 98B. Therefore, nodes 96B and 98B are charged and discharged (or vice-versa) substantially simultaneously toward the value to be stored within storage circuit 82. Update circuit 83F may complete the update operation more rapidly than other embodiments. The configuration of FIG. 12 may thereby be particularly suitable to high frequency applications.

Figure 13:
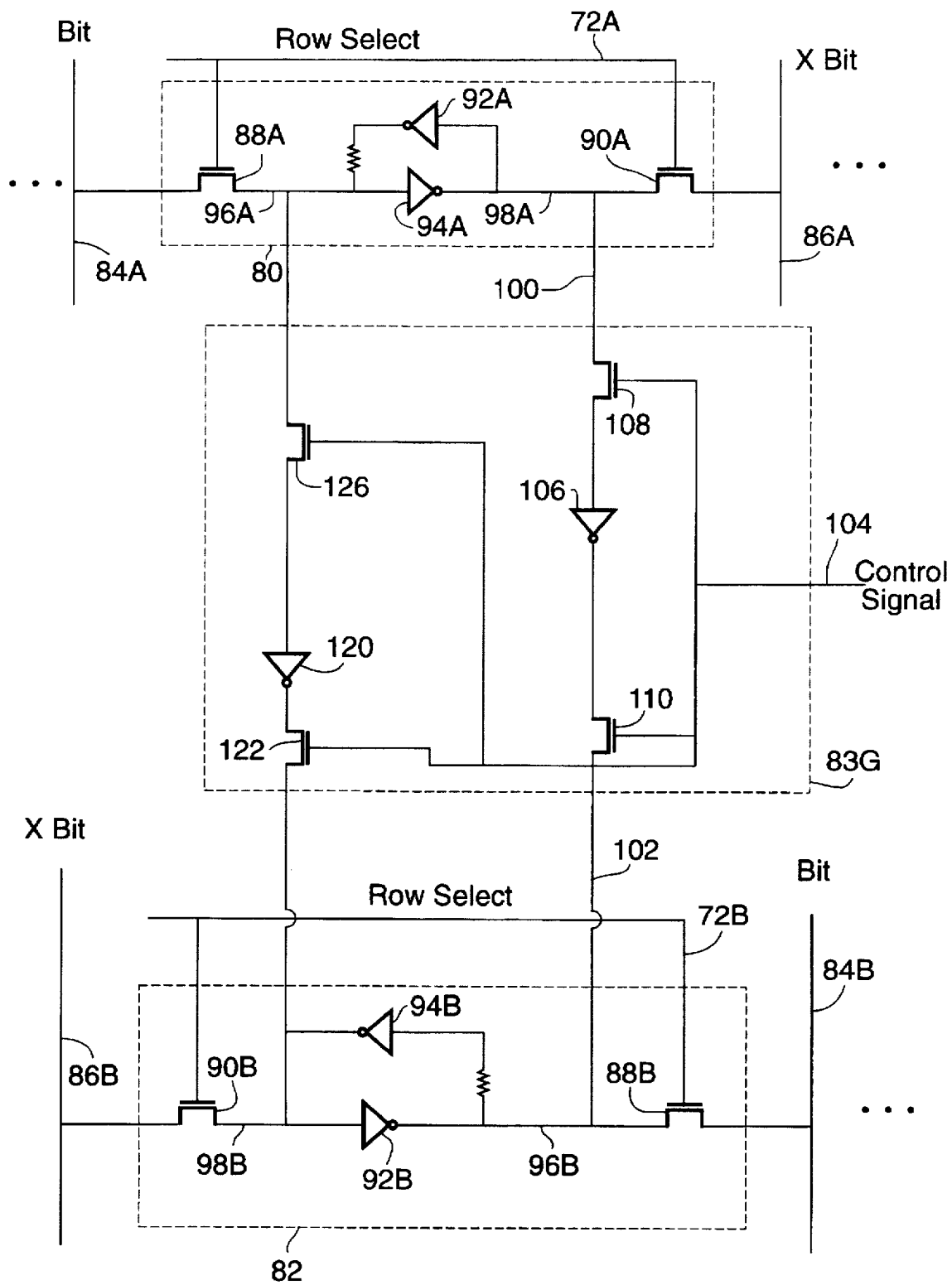
FIG. 13 is a circuit diagram of still another embodiment of the circuitry shown in FIG. 6.

Turning now to FIG. 13, another embodiment of storage circuits 80 and 82 and an embodiment of update circuit 83G is shown. In this embodiment, inverter 106 and transmission gates 108 and 110 are included. Additionally, an inverter 120, a transmission gate 122, and a transmission gate 126 are included. Inverter 120 is coupled between transmission gates 122 and 126. Transmission gates 122 and 126 have gate terminals coupled to control conductor 104. Additionally, transmission gate 126 is further coupled to node 96A within storage circuit 80 and transmission gate 122 is further coupled to node 98B within storage circuit 82. Inverter 120 inverts the logical value stored upon node 96A and conveys that value to node 98B. Therefore, nodes 96B and 98B are charged and discharged (or vice-versa) substantially simultaneously toward the value to be stored within storage circuit 82. Update circuit 83G may complete the update operation more rapidly than the circuit shown in FIG. 6. The configuration of FIG. 13 may thereby be particularly suitable to high frequency applications. Additionally, the circuit shown in FIG. 13 introduces a balanced load to each of nodes 96A, 98A, 96B, and 98B. In this manner, each node incurs an approximately equal capacitance.

As used herein, a memory refers to a collection of storage locations, accessed via an address such that a limited number of the storage locations may be simultaneously accessed. A memory may be an array in which a port is used to select one of the storage locations for access. Alternatively, a memory may comprise a plurality of registers coupled to input and output multiplexors. Each output multiplexor acts as a "read port", selecting one of the registers for conveyance as a read from the memory. Each input multiplexor acts as a "write port", selecting at most one of the inputs to write the register. Any circuitry which stores values and allows a limited number of values to be simultaneously accessed may comprise a memory.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a circuit has been disclosed which allows one storage circuit to update another storage circuit upon assertion of a control input. Such circuitry may be employed within a memory to allow update of each storage location within the memory upon assertion of a single control conductor. Advantageously, many storage locations may be updated simultaneously. Access to each of the storage locations is not required. For example, speculative and retired branch prediction information may be maintained within a branch prediction array. When a misprediction or exception occurs, the retired branch prediction information is copied to the speculative branch prediction information. Corruption of the speculative branch prediction information by instructions which were fetched and later purged due to misprediction or exception is thereby corrected. The correction is performed via assertion of a control signal, as opposed to accessing each affected entry and correcting the branch prediction information.

Numerous variations and modifications will become apparent to those skilled in the art once the above disclosure is fully appreciated. It is intended that the following claims be interpreted to embrace all such variations and modifications.

What is claimed is:

1. A memory, comprising:
   a first storage circuit configured to store at least one bit;
   a second storage circuit configured to store at least one bit; and
   an update circuit comprising an input conductor, an output conductor, and a control conductor, wherein said input conductor is coupled to said first storage circuit, and wherein said output conductor is coupled to said second storage circuit, and wherein said update circuit is configured to transmit said at least one bit stored within said first storage circuit upon said output conductor when a control signal upon said control conductor is asserted, and wherein said update circuit is configured to inhibit transmittal of said at least one bit stored within said first storage circuit when said control signal is deasserted, and wherein said second storage circuit is coupled to store said at least one bit transmitted upon said output conductor, and wherein said update circuit comprises a first transmission gate and a second transmission gate, and wherein said first transmission gate is coupled to said input conductor, and wherein said first transmission gate is coupled to receive said control signal and to transmit said at least one bit received upon said input conductor to said second transmission gate when said control signal is asserted.

2. The memory as recited in claim 1 wherein said first storage circuit and said second storage circuit each comprise a RAM cell.

3. The memory as recited in claim 2 wherein said RAM cell comprises:
   a pair of cross-coupled inverters;
   a first transistor coupled between said pair of cross-coupled inverters and a first conductor; and
   a second transistor coupled between said pair of cross-coupled inverters and a second conductor.

4. The memory as recited in claim 3 wherein said input conductor is coupled to a first node between said first transistor and said pair of cross-coupled inverters within said first storage circuit.

5. The memory as recited in claim 4 wherein a first voltage upon said first node is indicative of said at least one bit stored within said first storage circuit.

6. The memory as recited in claim 5 wherein said first voltage indicates a complement of said at least one bit stored within said first storage circuit.

7. The memory as recited in claim 3 wherein said output conductor is coupled to a second node between said first transistor and said pair of cross-coupled inverters within said second storage circuit.

8. The memory as recited in claim 7 wherein said a second voltage upon said second node is indicative of said at least one bit stored within said second storage circuit.

9. The memory as recited in claim 8 wherein said second voltage indicates a true value of said at least one bit stored within said first storage circuit.

10. The memory as recited in claim 1 wherein said second transmission gate is coupled to receive said at least one bit from said first transmission gate, and wherein said second transmission gate is coupled to said output conductor, and wherein said first transmission gate is coupled to receive said control signal and to transmit said at least one bit upon said output conductor when said control signal is asserted.

11. The memory as recited in claim 10 wherein said update circuit further comprises at least one inverter coupled between said first transmission gate and said second transmission gate, wherein said at least one inverter receives said at least one bit from said first transmission gate and transmits said at least one bit to said second transmission gate.

12. A memory, comprising:
a first storage circuit configured to store at least one bit;
a second storage circuit configured to store at least one bit; and
an update circuit comprising an input conductor, an output conductor, and a control conductor, wherein said input conductor is coupled to said first storage circuit, and wherein said output conductor is coupled to said second storage circuit, and wherein said update circuit is configured to transmit said at least one bit stored within said first storage circuit upon said output conductor when a control signal upon said control conductor is asserted, and wherein said update circuit is configured to inhibit transmittal of said at least one bit stored within said first storage circuit when said control signal is deasserted, and wherein said second storage circuit is coupled to store said at least one bit transmitted upon said output conductor, and wherein said update circuit comprises an inverter circuit and a transmission gate, and wherein said inverter circuit is coupled between said input conductor and said transmission gate, and wherein said transmission gate is further coupled to said output conductor and said control conductor, and wherein said transmission gate is configured to transmit a value at an output of said inverter circuit upon said output conductor upon assertion of said control signal.

13. A memory, comprising:
a first RAM cell configured to store at least one bit, said first RAM cell having a first node upon which a first voltage indicative of a complement of said at least one bit stored within said first RAM cell is conveyed;
a second RAM cell configured to store at least one bit, said second RAM cell having a second node upon which a second voltage indicative of a true value of said at least one bit stored within said second RAM cell is conveyed; and
an update circuit coupled between said first node and said second node, wherein said update circuit comprises an input conductor coupled to said first node, an output conductor coupled to said second node, and a control conductor configured to convey a control signal, and wherein said input conductor is electrically coupled to said output conductor if said control signal is asserted, and wherein said input conductor is electrically isolated from said output conductor if said control signal is deasserted, whereby said update circuit updates said second node according to said first voltage if said control signal is asserted;
wherein said update circuit comprises:
a first transmission gate coupled to said input conductor and coupled to receive said control signal such that said first transmission gate switches on if said control signal is asserted;
a second transmission gate coupled to said output conductor and coupled to receive said control signal such that said second transmission gate switches on if said control signal is asserted; and
at least one inverter coupled between said first transmission gate and said second transmission gate, whereby said input conductor is electrically coupled to said output conductor if said control signal is asserted.

14. A branch prediction array, comprising:
a first plurality of storage locations configured to store speculative branch prediction information;
a second plurality of storage locations configured to store retired branch prediction information; and
a plurality of update circuits coupled to receive a control signal, wherein each one of said plurality of update circuits is coupled between one of said second plurality of storage locations and one of said first plurality of storage locations, and wherein said each one of said plurality of update circuits is configured to update said one of said first plurality of storage locations with a value stored in said one of said second plurality of storage locations upon assertion of said control signal, and wherein said each one of said plurality of update circuits is configured to inhibit update of said one of said first plurality of storage locations upon deassertion of said control signal, and wherein said value stored in said one of said second plurality of storage locations comprises at least one bit, and wherein said each one of said plurality of update circuits comprises a first transmission gate and a second transmission gate, and wherein said first transmission gate is coupled to receive said control signal and to transmit said bit to said second transmission gate upon assertion of said control signal.

15. The branch prediction array as recited in claim 14 wherein said one of said first plurality of storage locations comprises at least one RAM cell having a first node.

16. The branch prediction array as recited in claim 15 wherein said one of said plurality of update circuits is coupled to said first node.

17. The branch prediction array as recited in claim 16 wherein said one of said plurality of update circuits is configured to charge and discharge said first node upon assertion of said control signal.

18. The branch prediction array as recited in claim 14 wherein said one of said second plurality of storage locations comprises at least one RAM cell having a second node.

19. The branch prediction array as recited in claim 18 wherein said one of said plurality of update circuit is coupled to said second node to receive said value stored within said one of said second plurality of storage locations.

20. The branch prediction array as recited in claim 14 wherein said control signal is indicative, when asserted, of a mispredicted branch instruction.

21. A method for maintaining speculative and non-speculative copies of a plurality of values within an array comprising:

updating said speculative copies of said plurality of values according to the speculative execution of instructions;

updating said non-speculative copies of said plurality of values according to the retirement of instructions; and copying said non-speculative copies of said plurality of values into said speculative copies of said plurality of values according to a control signal asserted to said array.

22. The method as recited in claim 21 wherein said plurality of values comprises a plurality of branch predictions.

23. The memory as recited in claim 7 wherein said update circuit further comprises a second output conductor coupled to a third node between said second transistor and said pair of cross-coupled inverters within said second storage circuit, and wherein said update circuit is configured to transmit a complement value upon said second output conductor concurrent with transmitting a value upon said output conductor, and wherein said complement value is a complement of said value.

24. The memory as recited in claim 23 wherein said update circuit further comprises a second input conductor coupled to a fourth node between said second transistor and said pair of cross-coupled inverters within said first storage circuit, and wherein said complement value is derived from a third voltage upon said fourth node.

* * * * *